United States Patent [19]

Detriche

[11] Patent Number: 4,513,195
[45] Date of Patent: Apr. 23, 1985

[54] METHOD AND APPARATUS FOR THE LATERAL POSITIONING OF A MEMBER RELATIVE TO A JOINT

[75] Inventor: Jean-Marie Detriche, Saint Germain en Laye, France

[73] Assignee: Commissariat a l'Energie Atomique, Paris, France

[21] Appl. No.: 532,394

[22] Filed: Sep. 15, 1983

[30] Foreign Application Priority Data

Sep. 15, 1982 [FR] France .................. 82 15569

[51] Int. Cl.³ .............................................. B23K 9/12
[52] U.S. Cl. .............................. 219/124.34; 318/576; 318/653
[58] Field of Search ...................... 219/124.34, 124.22; 318/576, 653

[56] References Cited

U.S. PATENT DOCUMENTS 4,206,391 6/1980 Varacins ........................... 318/576
4,441,010 4/1984 Cornu et al. .................... 219/124.34

FOREIGN PATENT DOCUMENTS 0036358 9/1981 European Pat. Off. .
0064454 11/1982 European Pat. Off. .
1615529 12/1970 Fed. Rep. of Germany .
2267854 11/1975 France .

Primary Examiner—Clifford C. Shaw
Attorney, Agent, or Firm—Oblon, Fisher, Spivak, McClelland & Maier

[57] ABSTRACT

The invention relates to a method and apparatus for the lateral positioning of a member relative to a joint formed between two metal surfaces and having discontinuities.

Use is made of an eddy current sensor having at least two probes staggered in the direction of the joint. The signals supplied by each probe are processed separately to obtain a signal representing the lateral displacement. By comparing said signal with a given threshold below the amplitude of the signal in the presence of a discontinuity, it is possible to only transmit to a servomotor signals which are below this threshold, which correspond to an effective measurement of the lateral displacement.

Application is to automatic welding machines.

12 Claims, 9 Drawing Figures

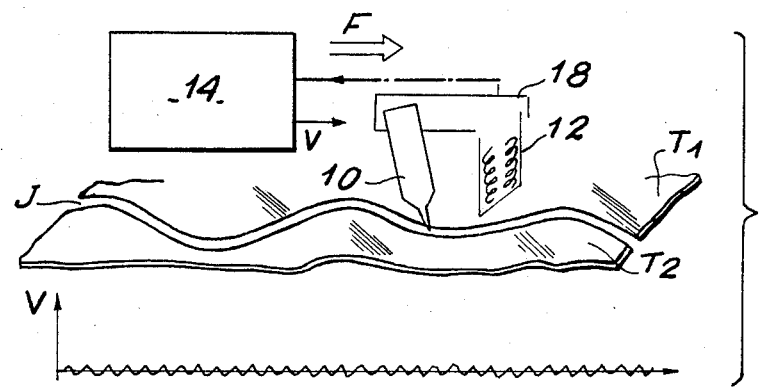
FIG.1a
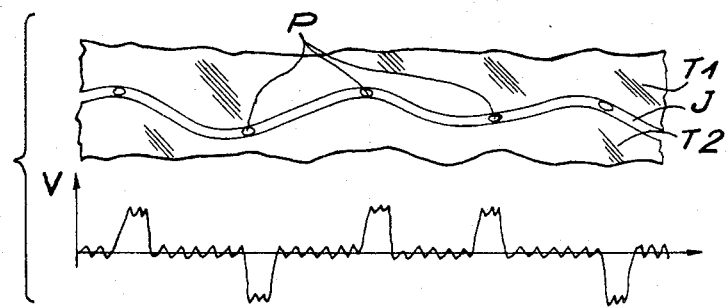
FIG.1b
FIG.2a
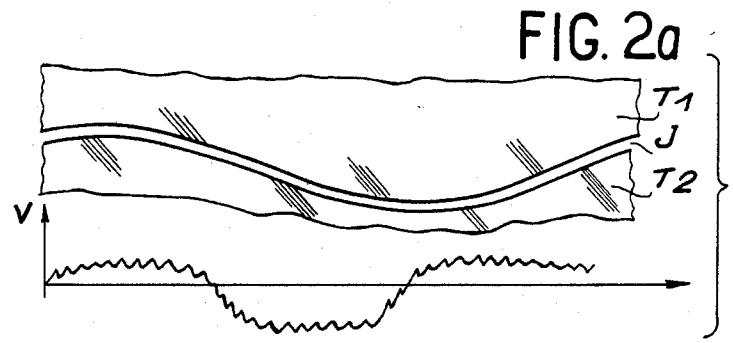
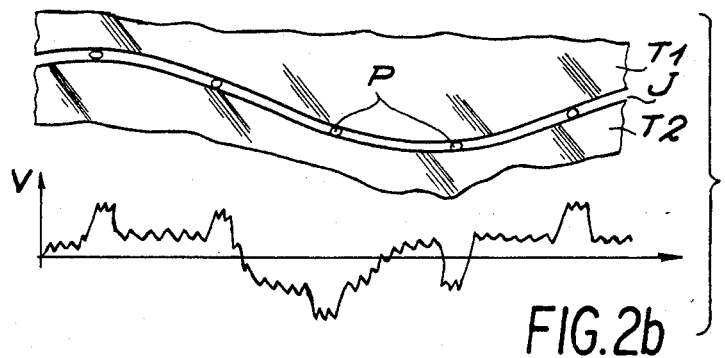
FIG.2b

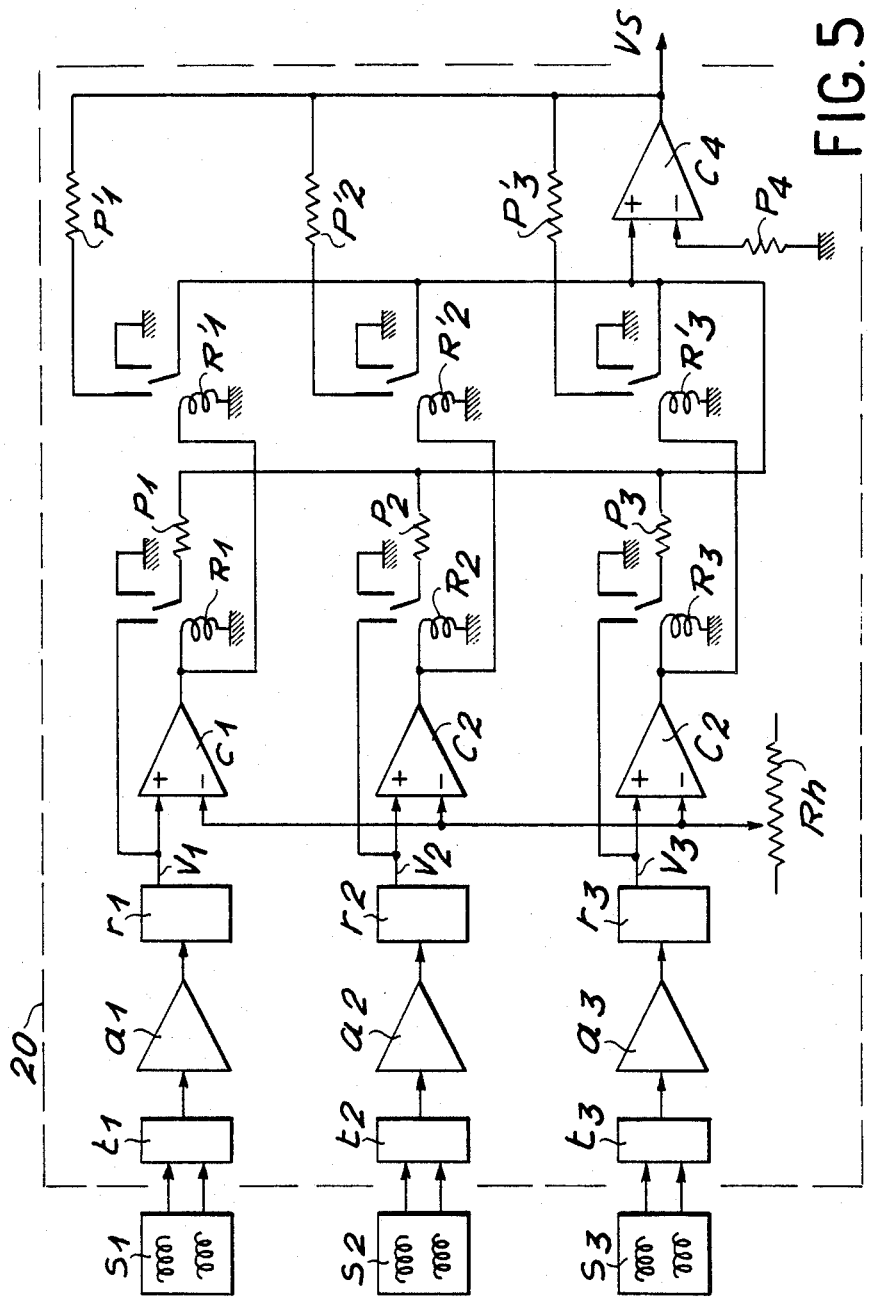

METHOD AND APPARATUS FOR THE LATERAL POSITIONING OF A MEMBER RELATIVE TO A JOINT

BACKGROUND OF THE INVENTION

The present invention relates to a method for the lateral positioning of a member relative to a joint, formed between two metal surfaces and having discontinuities or breaks, as well as to an apparatus for performing this method.

More specifically the present invention relates to the problem of the automatic lateral positioning of a member, such as a welding torch relative to a joint separating two parts to be welded, when said parts are held in position by previously made weld spots. These weld spots are generally produced manually in a random manner, so that their spacing and shape vary. Thus, these weld spots constitute discontinuities of the joint formed between the two parts, which are distributed in a random manner along the joint.

It is clear that the presence of these weld spots along the joint separating the two parts to be welded can disturb the operation of a welding head equipped with a device ensuring its automatic lateral positioning. Thus, the automatic positioning device may lose the joint at the time of passing the weld spot and consequently may guide the welding torch outside the working area.

These risks are particularly great when the automatic lateral positioning device uses eddy current sensors, because the latter very sensitively react to the weld spots, constituting a discontinuity of the joint separating metal surfaces, i.e. a short-circuit between the surfaces of the metal sheets to be welded. It is consequently not possible to control the welding torch directly as a function of the information supplied by the sensors, because this would lead to very significant position variations on passing the weld spots.

Obviously, the application to the welding of two metal sheets is not limitative and the invention can be used for solving any lateral positioning problem of a member relative to a joint formed between two metal surfaces and having discontinuities.

In the present state of the art there are on the one hand sensors which are in contact with the joint, and on the other hand sensors which are not in contact.

Among these sensors which are in contact with the joint, sensors of the passive type are known, which are constituted by sensing rods maintained in engagement with the joint and whose displacements are detected by position sensors making it possible to locate the joint in a plane transverse thereto. The behaviour of these detection systems on passing the weld spots is not satisfactory, because the rod can lose its guidance and can leave the joint. In certain cases, mechanical devices attachable to the end of the sensing rods make it possible to pass the weld spots, but such systems are not absolutely reliable.

Among sensors which are in contact with the joint, there are those of the active type also having a sensing rod connected to position sensors, as well as actuators making it possible to mobilize the rod. Such sensors make it possible to record the position of discontinuities along the joint during an operation in preparation for welding. During the actual welding operation, the device is then made inactive at the time when it passes the weld spots. However, in such a system, the recording operation is long and costly, so that it is inappropriate for solving the problem in question.

The known detection systems in contact with the metal sheets consequently fail to adequately solve the problem of passing weld spots in a joint formed between two metal surfaces. The prior art is even more limited with regards to contactless sensors, because no publication dealing with eddy current or other sensors (e.g. optical sensor) refers to the problem of passing weld spots.

SUMMARY OF THE INVENTION

The object of the present invention is to provide a solution to the problem of passing weld spots, which is both simple and economic to perform, in the case where the sensors used are contactless eddy current sensors.

The present invention therefore proposes a method for the lateral positioning of a member relative to a joint formed between two metal surfaces and having discontinuities, according to which use is made of at least one eddy current probe supplying a first signal which is treated to obtain a positioning signal varying with the displacement of the axis of the probe with respect to the axis of the joint, said positioning signal being transmitted to servocontrol means controlling the lateral displacement of the member, wherein use is made of at least two eddy current probes staggered in the direction of the joint, the positioning signal corresponding to each of these probes is compared at the limits of a given interval and the transmission of one of the positioning signals to the servocontrol means is interrupted, when said signal passes outside the said interval.

Thus, the invention is based on two points.

1. The very simple idea consisting of arranging several probes in the direction of the joint, which makes it possible to ensure in all cases the servocontrol of the welding torch by using the valid signal supplied by at least one of the probes and of not taking account of the output of the or other probes when they pass in front of a weld spot.

2. The experimental finding that the passage of an eddy current probe over a weld spot produces a sudden variation, of random sign, of the amplitude of the signal supplied by this probe. The detection of this variation makes it possible to indicate the passage of the probe in front of the weld spot and consequently to control the interruption of the transmission of the signal corresponding to the servocontrol means. The results obtained experimentally when utilizing such a method have been satisfactory.

According to a first constructional variant of the invention, the sum of the position signals contained in said interval is determined in order to transmit a signal representing this sum to the servocontrol means.

According to a second constructional variant of this method, the weighted average of the positioning signals contained in said interval is determined in order to transmit a signal representing this average to the servocontrol means.

Preferably, the gain of the positioning signal corresponding to each probe is regulated in such a way that the interval is the same for each of the positioning signals.

According to a preferred embodiment of the invention, each positioning signal is rectified before comparing it with a threshold.

Preferably, in order to overcome the measuring noise, it is possible to filter each measured positioning signal and subtract this filtered signal from the positioning signal before comparing it with the said interval.

The invention also relates to an apparatus for performing the aforementioned positioning method.

More specifically the present invention then relates to an apparatus for the lateral positioning of a member relative to a joint formed between two metal surfaces and having discontinuities, said apparatus incorporating at least one eddy current probe supplying a first signal, at least one means for processing said first signal supplying a positioning signal representing the displacement of the axis of the probe relative to the axis of the joint, and servocontrol means sensitive to this positioning signal in order to control the lateral displacement of the member, wherein the apparatus comprises at least two eddy current probes staggered in the direction of the joint, a processing means associated with each probe, means for comparing the position signal supplied by each processing means at the limits of a given interval, and means for interrupting the transmission of one of the positioning signals to the servocontrol means when said signal passes beyond said interval.

BRIEF DESCRIPTION OF THE DRAWINGS

A description will now be given in an exemplified and non-limitative manner of preferred embodiments of the invention, with reference to the attached drawings, wherein show:

FIGS. 1a and 1b respectively, diagrammatically illustrate the response curve of an eddy current sensor with two coils located on either side of the joint, when the joint is perfectly aligned with the movement of the welding torch on the one hand when the joint has no weld spot and on the other hand when the joint has weld spots.

FIGS. 2a and 2b views similar to FIGS. 1a and 1b illustrating the case where the joint to be welded is not perfectly aligned with the movement of the welding torch.

FIG. 5 a second embodiment of the processing circuit of FIG. 4.

DETAILED DESCRIPTION OF THE PREFERRED EMBODIMENTS

Figure 3:
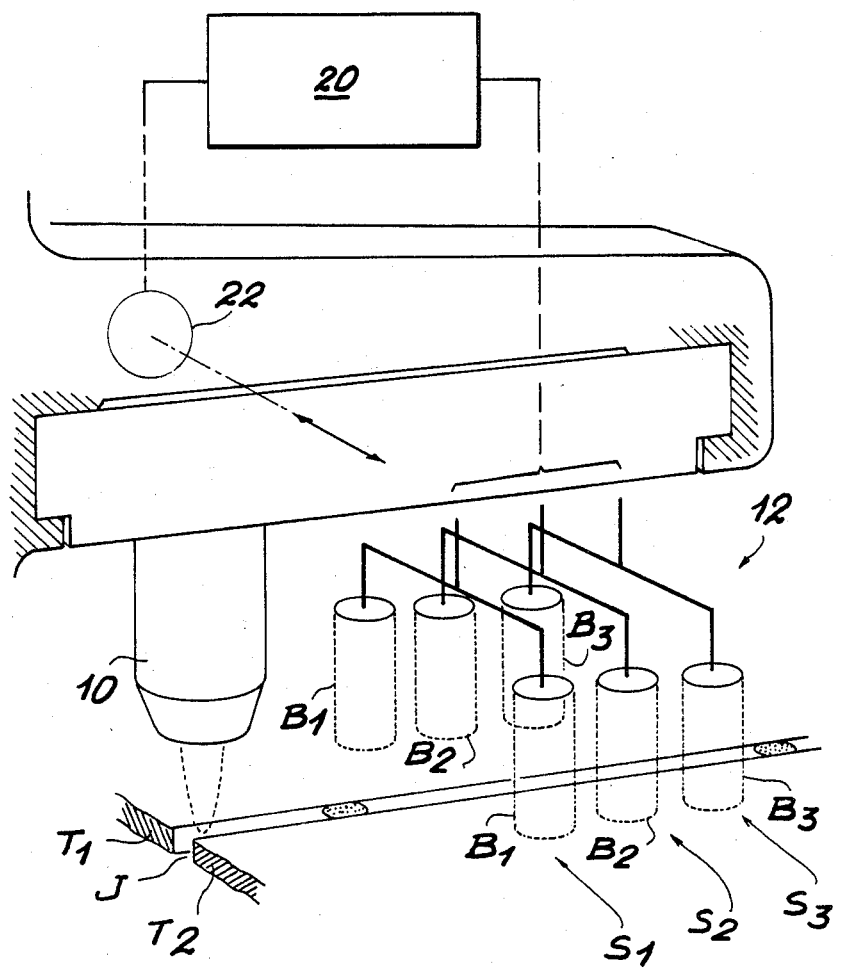
FIG. 3 diagrammatically an embodiment of the invention according to which the detector has three eddy current sensors staggered in the direction of the joint.

In the upper part of FIG. 1a are diagrammatically shown two metal sheets $T_1$ and $T_2$ to be welded and which have between them a discontinuity-free joint J, together with the welding torch 10 in front of which (displacement direction F) is placed an eddy current sensor 12 supplying a signal which is processed in a processing circuit 14 associated with said sensor, so as to obtain a signal V representing the possible displacement of the sensor relative to the joint. Signal V can be used for controlling the displacement of the welding head 18 carrying the torch and the sensor by means of a not shown servomotor.

The eddy current sensor 12 is constituted by a probe having two coils positioned on either side of joint J and arranged symmetrically relative to the plane perpendicular to sheets $T_1$ and $T_2$ passing through the joint in a transverse plane with respect to the latter. Processing circuit 14 performs a differential phase measurement according to French Patent Application No. 80 05 909 in the name of the Commissariat à L'Energie Atomique.

The bottom part of FIG. 1a shows the evolution of signal V supplied by processing circuit 14 as a function of the displacement of the welding head 18, when the joint is perfectly aligned with the movement of the latter. It can be seen that under these conditions the signal V is virtually zero, with the exception of the measuring noise.

However, in FIG. 1b it can be seen that if the same experiment is carried out in the case where the sheets $T_1$ and $T_2$ are held in place by weld spots P distributed along joint J, signal V supplied by the processing circuit has a variation at the time of passing the weld spots. This variation has a random sign, as a function of the appearance of the spot, which can have a variable size and can be off-centred relative to the joint. Bearing in mind this variation of the signal on passing the spots, a direct servocontrol on the output of processing circuit 14 associated with the sensor would not permit permanent setting of the joint.

The experiments illustrated in FIGS. 1a and 1b make it possible to analyse the behaviour of these signals when the support of the tool strictly follows the joint, i.e. when the servosystem does not come into action. However, the experiments illustrated in FIGS. 2a and 2b relate to the case where the sensor is made to follow this joint. In this case, it can be seen particularly in Gif. 2a which, like FIG. 1a, relates to the case where joint J has no discontinuity, signal V obtained at the output of circuit 14 is an image of the error signal of the servosystem.

In the case of FIG. 2b which, like FIG. 1b, illustrates the experiment corresponding to a joint having weld spots P, said signal V also has noise-subject peaks of random sign on passing the weld spots.

On the basis of the experiment illustrated in FIG. 2b, which corresponds to the standard case of a position servocontrol on a joint having weld spots, the invention proposes:

1. not to take account of the signal V obtained from an eddy current probe when the latter passes over a weld spot, i.e. when signal V undergoes a sudden variation with an amplitude exceeding a given threshold;
2. ensuring the guidance of the sensor during its passage over the weld spot, which makes it necessary to use a sensor having at least two probes staggered in the direction of the joint.

The arrangemet of these probes must obviously be such that the measurement performed with the aid of at least one of them is valid, in order to ensure the continuity of the servocontrol.

There is another limitation to the use of such sensors, which is due to the radius of curvature of the joint to be welded or, which is equivalent thereto, to the maximum variation permitted between the theoretical position and the true position of the joint.

Thus, there must be no confusion between a voltage variation experienced on a probe as a result of the passage thereof over a weld spot, or due to the detection of a trajectory variation. However, it should be noted that in practice, the trajectories are quasi-rectilinear and their position variation slow. Moreover, it will be seen hereinafter that it is possible to make the detector unit dependent on a mean value of the responses of the probes, which reduces the possibly detected trajectory variations. Therefore this utilization limitation has virtually no effect.

FIG. 3 shows in exemplified manner the case where sensor 12 has three probes $S_1$, $S_2$ and $S_3$ staggered in the direction of the joint and each having two eddy current coils $B_1$, $B_2$, $B_3$, respectively disposed on either side of the joint. The signals supplied by sensor 12 are transmitted to electronic processing means 20, which supply a positioning signal used for the control of the lateral setting of the torch 10 and sensor 12 by means of a servomotor 22.

Figure 4:
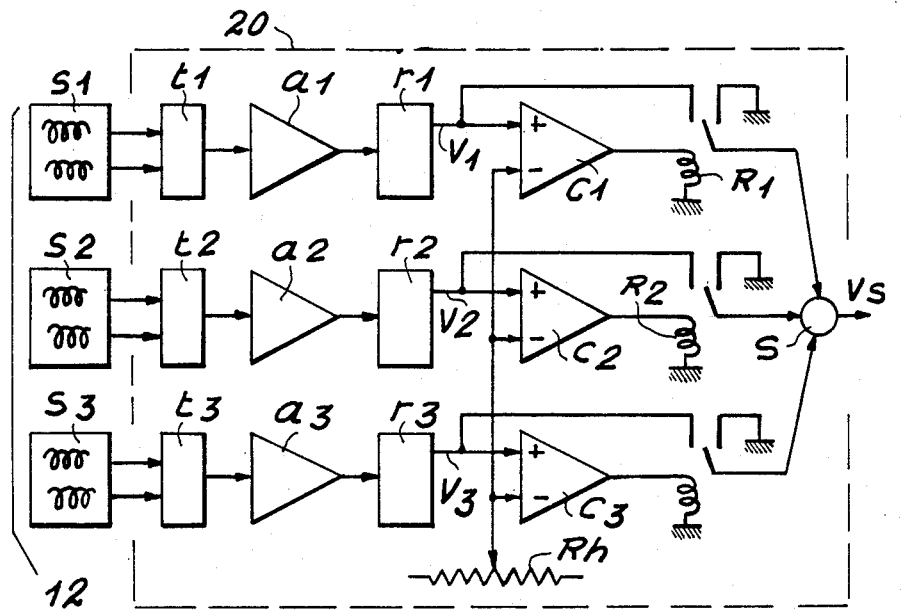
FIG. 4 a first embodiment of the electronic circuit for processing the signal supplied by the three probes of the sensor of FIG. 3 making it possible to ensure that a member such as a welding torch follows a joint formed between two metal sheets to be welded.

FIG. 4 shows in greater detail the processing means 20, which comprise on each of the probes $S_1$, $S_2$ and $S_3$ of sensor 12, an identical electronic processing chain, said chains operating in parallel.

Thus, the signal supplied by each of the probes $S_1$, $S_2$ and $S_3$ is processed in a processing circuit $t_1$, $t_2$ and $t_3$ respectively, so as to obtain a positioning signal representing the displacement of the axis of the corresponding probe relative to the axis of the joint. Preferably, like circuit 14 in FIG. 1a, processing circuits $t_1$, $t_2$ and $t_3$ are circuits which perform a differential phase measurement according to French Patent Application No. 80 05 909 in the name of the Commissariat a l'Energie Atomique.

The positioning signals applied by the processing circuits $t_1$, $t_2$ and $t_3$ are applied to the input of three amplifiers $a_1$, $a_2$ and $a_3$ respectively. The function of these amplifiers is to regulate the dynamics of the positioning signals, i.e. to balance these signals in such a way that they are of the same amplitude when the corresponding probes are in the same situation. This control is obtained by adjusting the gains of the amplifiers.

The signals supplied by each of the amplifiers $a_1$, $a_2$ and $a_3$ are then rectified in rectifiers $r_1$, $r_2$ and $r_3$ respectively. In this way, account is taken of the random character of the sign of the signal supplied by the processing circuits when weld spots are present.

The rectified signals are then applied to the positive input of three comparators $c_1$, $c_2$ and $c_3$, whose negative inputs are connected to a not shown voltage supply across a rheostat Rh defining a regulatable threshold. Due to the presence of amplifiers $a_1$, $a_2$ and $a_3$ ensuring the control of the response dynamics of the three parallel circuits, it is possible to only have a single threshold level simultaneously regulated for the three circuits.

The output signal of each of these comparators $c_1$, $c_2$ and $c_3$ then controls a switching relay $R_1$, $R_2$ and $R_3$ respectively. When these relays are not excited, i.e. when the signals $V_1$, $V_2$ and $V_3$ leaving rectifiers $r_1$, $r_2$, and $r_3$ are below the threshold of the comparators, said signals $V_1$, $V_2$ and $V_3$ are applied to the inputs of an adder S. Conversely, when one of the relays $R_1$, $R_2$ or $R_3$ is excited, i.e. when the corresponding signal $V_1$, $V_2$ or $V_3$ is above the threshold determined by rheostat Rh, the corresponding input of adder S is connected to earth.

In a not shown variant, the switching relays could then be replaced by analog gates.

Finally, adder S supplies a signal $V_s$, which supplies motor 22 (FIG. 3) controlling the servosystem of the welding head carrying the torch and the sensor.

Thus, the processing circuit of FIG. 4 makes it possible to not transmit to motor M signals exceeding a certain threshold, the latter being determined beforehand so as to correspond to the peak transmitted by a probe when a weld spot is present and as described relative to FIG. 2b. This circuit also makes it possible to control the servomotor 22 with the aid of a signal $V_s$ representing the sum of the position variation measured with the aid of probes supplying valid signals.

Thus, the circuit of FIG. 4 does not make it possible to obtain the average or mean of the valid information from the sensor at the output of adder S, so that only the sum of the valid signals can be obtained. This is not generally prejudicial in so far as signal $V_s$ is used for controlling a position servocontrol, because its only consequence is to increase the gain of the latter when the number of probes supplying a signal considered to be valid increases.

However, there are delicate detection cases, where it is desired by the servocontrol gain is constant. To this end FIG. 5 shows a second embodiment of the electronic processing means 20, in which the weighted average of the signals considered to be valid is determined in order to control the servomotor.

More specifically, the arrangement of FIG. 5 is identical to that of FIG. 4 up to the output of switching relays $R_1$, $R_2$, $R_3$. At this point, instead of being directly connected to the inputs of an adder S, the outputs of relays $R_1$, $R_2$ and $R_3$ are interconnected across three resistors $P_1$, $P_2$ and $P_3$, then to the inputs of three gain switching relays $R'_1$, $R'_2$, $R'_3$, whose coils can be excited in the same way as those of relays $R_1$, $R_2$ and $R_3$ by signals from comparators $c_1$, $c_2$ and $c_3$. The outputs of relays $R_1$, $R_2$ and $R_3$, which are connected across resistors $P_1$, $P_2$ and $P_3$ are connected to the positive input of a comparator $c_4$, whose negative input is connected to earth across a resistor $P_4$, Finally, the outputs of relays $R'_1$, $R'_2$ and $R'_3$ are interconnected and to the output of comparator $c_4$ across three resistors $P'_1$, $P'_2$ and $P'_3$. Signal $V_s$ supplied at the output of comparator $c_4$ is used for controlling the servomotor 22, as in the embodiment of FIG. 4.

It should be noted that in the circuit described hereinbefore the values of resistors $P_1$, $P_2$, $P_3$ $P'_1$, $P'_2$, $P'_3$ and $P_4$ are the same.

When the three signals are considered to be valid by comparators $c_1$, $c_2$ and $c_3$ none of the relays is excited and the positive input of comparator $c_4$ receives, across resistors $P_1$, $P_2$ and $P_3$, all the signals from rectifiers $r_1$, $r_2$ and $r_3$. Simultaneously relays $R'_1$, $R'_2$ and $R'_3$ operate in the same sense as relays $R_1$, $R_2$ and $R_3$, so that these signals are also transmitted to the output of comparator $c_4$ across resistors $P'_1$, $P'_2$ and $P'_3$.

When one of the signals, e.g. $V_1$, is not valid, it exceeds the threshold of the corresponding comparator $C_1$ and the two relays $R_1$ and $R'_1$ associated therewith are excited. The outputs of these relays are thus connected to earth.

As a result of these characteristics, the gain of the circuit varies as a function of the number of probes validated by the comparators, so that the signal $V_s$ injected into servomotor 22 (FIG. 3) corresponds to the weighted summation of these signals.

If reference is again made to FIG. 2b, it can be seen that if the error signal is highly variable, it can be difficult to determine the threshold level making it possible to detect the weld spots without risking either the validation of certain signals which correspond to a weld spot, or conversely cancelling out part of the error signal which should be considered as valid.

Figure 6:
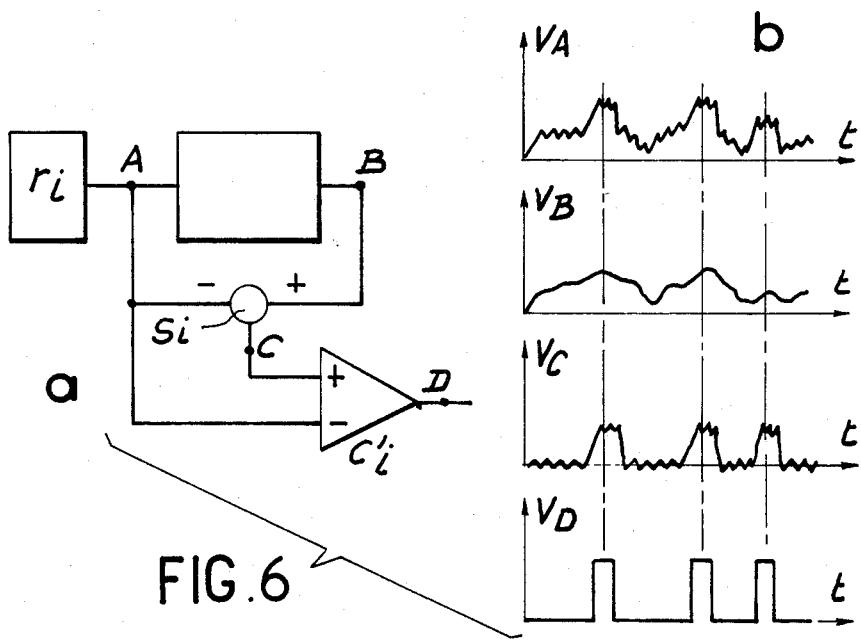
FIGS. 6a and 6b respectively, a variant which can be introduced into the processing circuits of FIGS. 4 and 5 and the evolution, as a function of time, of the signals appearing at different points of the thus modified circuit.

In order to obviate this disadvantage, it is possible to use in the manner shown in FIG. 6a an adaptive threshold circuit. Such a circuit can be introduced both into the circuit of FIG. 4 and into the circuit of FIG. 5, into each of the parallel circuits associated with probes $S_1$, $S_2$ and $S_3$ between rectifier $r_i$ and comparator $c_i$.

As illustrated in FIG. 6a, this adaptive threshold circuit comprises a low-pass filter $f_i$ into which is injected the signal from rectifier $r_i$, as well as an adder $s_i$ in which the signal from filter $f_i$ is subtracted from the rectified signal in such a way as to eliminate the variable level disturbing the measurement.

The signal supplied by adder $s_i$ is injected into the positive input of a comparator $c'_i$, whose negative input is connected to the output of rectifier $r_i$.

FIG. 6b shows an exemplified manner the course of signals $V_A$ at a point A located at the output of rectifier $r_i$, $V_B$ at a point B located at the output of the low-pass filter $f_i$, $V_C$ at a point C located at the output of adder $s_i$ and $V_D$ at a point D located at the output of comparator $c'_i$, as a function of time t. The latter signal $V_D$ is injected at the positive input of comparator $c_1$, $c_2$, or $c_3$, in order to be compared with the threshold determined by means of rheostat Rh.

As a result of the method and apparatus described hereinbefore with reference to FIGS. 1 to 6, it can be seen that the problem of a welding head equipped with eddy current sensors moving past weld spots is solved in a simple and economic manner. In addition, the experimentally retained results are satisfactory.

Obviously the invention is not limited to the embodiments described hereinbefore and in fact covers all variants. In particular, it has been seen that the number of probes constituting the sensor can correspond to any integer equal to or higher than 2. In the same way, it has been seen that the electronic signal processing circuit can be modified in a number of ways without passing beyond the scope of the invention. Finally, the different components of this circuit can be replaced by any component or group of components fulfilling the same function. In particular, the switching relays can be replaced by analog gates.

What is claimed is:

1. A method for the lateral positioning of a member relative to a joint formed between two metal surfaces and having discontinuities, according to which use is made of at least two eddy current probes staggered in the direction of the joint, each probe having two coils positioned on either side of said joint and arranged symmetrically relative to a plane perpendicular to said surfaces and passing through the joint, in a transverse plane with respect to said joint, each probe supplying a first signal which is treated to obtain a positioning signal varying with the displacement of the axis of the probe with respect to the axis of the joint, said positioning signal being transmitted to servocontrol means controlling the lateral displacement of said member, wherein the positioning signal corresponding to each of these probes is compared to a given threshold, said threshold being below the amplitude of said signal when the corresponding probe is in front of a discontinuity, the transmission of one of the positioning signals to the servocontrol means being interrupted, when said one signal is above said threshold.

2. A method according to claim 1, wherein the sum of the positioning signals which are below said threshold is determined, in order to transmit a signal representing this sum to the servocontrol means.

3. A method according to claim 1, wherein the average value of the positioning signals which are below said threshold is determined in order to transmit a signal representing this value to the servocontrol means.

4. A method according to claim 1, wherein the gain of the positioning signal corresponding to each probe is regulated, in such a way that the threshold is the same for each of the positioning signals.

5. A method according to claim 1, wherein each positioning signal is rectified before comparing it with said threshold.

6. A method according to claim 1, wherein each measured positioning signal is filtered and wherein said filtered signal is subtracted from the measured positioning signal before comparing it with the said threshold.

7. An apparatus for the lateral positioning of a member relative to a joint formed between two metal surfaces and having discontinuities, said apparatus incorporating at least two eddy current probes staggered in the direction of the joint, each probe having two coils positioned on either side of said joint and arranged symmetrically relative to a plane perpendicular to said surfaces and passing through the joint, in a transverse plane with respect to said joint, each probe supplying a first signal, a processing means associated with each probe for processing the corresponding first signal, each of said processing means supplying a positioning signal representing the displacement of the axis of the corresponding probe relative to the axis of the joint, and servocontrol means sensitive to these positioning signals in order to control the lateral displacement of the member, wherein said apparatus further comprises means for comparing the positioning signal supplied by each processing means to a given threshold, said threshold being below the amplitude of said signal when the corresponding probe is in front of a discontinuity, and means for interrupting the transmission of one of the positioning signals to the servocontrol means when said signal is above said threshold.

8. An apparatus according to claim 7, wherein it also comprises means for adding the positioning signals supplied by the processing means and which are below said threshold, before transmitting these signals to the servocontrol means.

9. An apparatus according to claim 7, wherein it also comprises means for determining the average value of the positioning signals, before transmitting these signals to the servocontrol means.

10. An apparatus according to claim 1, wherein it also comprises means for amplifying the positioning signal corresponding to each probe with a gain such that the threshold is the same for each of the positioning signals.

11. An apparatus according to claim 7, wherein it also comprises means for rectifying each of the positioning signals before transmitting it to the means for comparing this signal with said threshold.

12. An apparatus according to claim 7, wherein it also comprises means for filtering each measured positioning signal and means for subtracting this filtered signal from the measured positioning signal, before transmitting it to the means for comparing it with the said threshold.

* * * * *